(12) United States Patent
Brammer et al.

(10) Patent No.: US 8,359,942 B2
(45) Date of Patent: Jan. 29, 2013

(54) TRANSMISSION ACTUATOR

(75) Inventors: Christian Brammer, Bergen (DE); Mike Heurich, Apelern (DE); Reiner Hölscher, Seelze (DE); Andreas Sievers, Sehnde (DE); Tino Wiggers, Seelze (DE)

(73) Assignee: WABCO GmbH, Hannover (DE)

( * ) Notice: Subject to any disclaimer, the term of this patent is extended or adjusted under 35 U.S.C. 154(b) by 287 days.

(21) Appl. No.: 12/736,093

(22) PCT Filed: Feb. 4, 2009

(86) PCT No.: PCT/EP2009/000728
§ 371 (c)(1),
(2), (4) Date: Oct. 29, 2010

(87) PCT Pub. No.: WO2009/115167
PCT Pub. Date: Sep. 24, 2009

(65) Prior Publication Data
US 2011/0041639 A1 Feb. 24, 2011

(30) Foreign Application Priority Data
Mar. 15, 2008 (DE) .................. 10 2008 014 504

(51) Int. Cl.
*F16H 59/02* (2006.01)
*F16H 61/02* (2006.01)
*F16H 61/68* (2006.01)
*F16H 61/70* (2006.01)

(52) U.S. Cl. .................. 74/355; 74/473.12; 324/207.11; 324/207.14; 324/207.24

(58) Field of Classification Search .................. 74/335, 74/473.12, 473.36, 473.37; 192/30 W; 340/456; 324/207.11, 207.13, 207.14, 207.2, 207.22, 324/207.24
See application file for complete search history.

(56) References Cited

U.S. PATENT DOCUMENTS

| | | | | | |
|---|---|---|---|---|---|
| 5,219,391 | A | * | 6/1993 | Edelen et al. | 74/335 |
| 5,266,917 | A | * | 11/1993 | Bleeke et al. | 338/32 H |
| 5,417,124 | A | * | 5/1995 | Huff et al. | 74/335 |
| 5,651,292 | A | * | 7/1997 | Genise | 74/745 |
| 5,743,143 | A | * | 4/1998 | Carpenter et al. | 74/335 |
| 5,845,544 | A | * | 12/1998 | Huggins et al. | 74/606 R |
| 5,894,758 | A | * | 4/1999 | Walker | 74/335 |
| 5,992,267 | A | * | 11/1999 | Smith et al. | 74/745 |

(Continued)

FOREIGN PATENT DOCUMENTS

| | | |
|---|---|---|
| EP | 1 055 914 A1 | 11/2000 |
| EP | 1 160 485 A2 | 12/2001 |

(Continued)

*Primary Examiner* — Troy Chambers
*Assistant Examiner* — Valentin Craciun
(74) *Attorney, Agent, or Firm* — Kramer Levin Naftalis & Frankel LLP

(57) ABSTRACT

A transmission actuator for a transmission includes a split sensor configured to detect a switching position of a split phase rod of the transmission that can be longitudinally displaced in a split sensor measuring direction. The transmission actuator further includes a gate sensor configured to detect a gate rod position of a gate rod of the transmission that can be longitudinally displaced in a gate sensor measuring direction, and a gear sensor configured to detect a gear rod position of a gear rod of the transmission that can be longitudinally displaced in a gear sensor measuring direction. Two measuring directions extend substantially parallel and span a measuring direction plane, and a third measuring direction forms an obtuse angle with the measuring direction plane.

14 Claims, 6 Drawing Sheets

U.S. PATENT DOCUMENTS

| | | | |
|---|---|---|---|
| 6,105,448 A * | 8/2000 | Borschert et al. | 74/335 |
| 6,319,171 B1 * | 11/2001 | Hughes et al. | 477/111 |
| 6,382,040 B1 | 5/2002 | Diangelo et al. | |
| 6,626,056 B2 * | 9/2003 | Albert et al. | 74/335 |
| 6,736,024 B1 * | 5/2004 | Spence et al. | 74/473.1 |
| 7,302,872 B2 * | 12/2007 | Ichikawa et al. | 74/335 |
| 2001/0004620 A1 * | 6/2001 | Onuki | 477/115 |
| 2003/0176258 A1 | 9/2003 | Ohtsuka | |
| 2004/0263155 A1 * | 12/2004 | Schroeder et al. | 324/207.12 |
| 2005/0107211 A1 * | 5/2005 | Itoh et al. | 477/116 |
| 2006/0011008 A1 * | 1/2006 | Hara et al. | 74/473.36 |
| 2007/0028709 A1 * | 2/2007 | Futamura et al. | 74/335 |
| 2007/0216402 A1 * | 9/2007 | Blessing et al. | 324/207.24 |
| 2011/0043348 A1 * | 2/2011 | Blackard et al. | 340/439 |

FOREIGN PATENT DOCUMENTS

| | | |
|---|---|---|
| EP | 1 160 485 A3 | 12/2001 |
| FR | 2 749 907 | 12/1997 |

* cited by examiner

TRANSMISSION ACTUATOR

FIELD OF THE INVENTION

The invention generally relates to embodiments of a transmission actuator for transmissions, including embodiments having (a) a split sensor designed to detect a shift position of a split stage rod of the transmission that is longitudinally movable in a split sensor measurement direction, (b) a shift gate sensor designed to detect a shift gate rod position of a shift gate rod of the transmission that is longitudinally movable in a shift gate sensor measurement direction, and (c) a gear sensor designed to detect a gear rod position of a gear rod of the transmission that is longitudinally movable in a gear sensor measurement direction.

BACKGROUND OF THE INVENTION

Transmission actuators of the general type under consideration are known and serve to detect a shift state of the transmission. Disadvantages of known transmission actuators are their complex production and cumbersome mounting on a transmission. Known transmission actuators also have a relatively high probability of failure.

EP 1 055 914 describes an arrangement of magnetic position sensors, which is frequently used in transmission actuators. The arrangement described relates, however, to the detection of a rotation and translatory movements. In contrast, in accordance with embodiments of the present invention, three translatory movements are detected.

SUMMARY OF THE INVENTION

Generally speaking, it is an object of the invention to provide a transmission actuator in which the shift positions of split stage, gear and shift gate can be measured with increased accuracy.

This object can be achieved by means of a transmission actuator in which two of the measurement directions run substantially parallel and span a measurement direction plane, and the third of the measurement directions forms an obtuse angle with the measurement direction plane.

An advantage of a transmission actuator in accordance with embodiments of the present invention is its low susceptibility to failure. In conventional transmission actuators, the shift from one transmission state into another can have the effect that not only one of the sensors detects a signal, as should be the case, but rather two or all of the sensors provide a signal. This is attributable to the fact that the individual sensors influence one another. The transmission actuator according to the inventive embodiments substantially suppresses such interfering signals on account of the spatial arrangement of the sensors, such that the evaluation is simpler and less susceptible to faults.

A further advantage is that the transmission actuator according to embodiments of the invention permits a simple structural shape, which enables simple and fast assembly of the transmission actuator. The transmission actuator according to the inventive embodiments also has a small installation space and is therefore space-saving.

Within the context of the present description, a detection of a shift position or of a position is to be understood in particular to mean any process in which measured values are recorded, on the basis of which the shift position or the position is inferred. The position may be a binary designation, that is, whether for example the split stage rod is situated in a first or a second position. The detection preferably yields a position value that constitutes the specification of a position relative to the transmission or to the transmission actuator.

The split sensor measurement device generally runs parallel to a longitudinal direction of the split stage rod, the shift gate sensor measurement device generally runs parallel to a longitudinal direction of the shift gate rod, and the gear sensor measurement device generally runs parallel to a longitudinal direction of the gear rod.

The feature that the split sensor is designed to detect a shift position of a split stage rod, which is longitudinally movable in a split sensor measurement direction, of the transmission means in particular also that the split stage rod has a split stage movement direction corresponding to the split sensor measurement direction. Correspondingly, the shift gate rod has a shift gate rod movement direction that corresponds to the shift gate sensor measurement direction. If a split stage of the transmission is shifted, this leads to a longitudinal movement of the split stage rod in a split stage rod movement direction corresponding to the split sensor measurement direction.

The feature that two of the measurement directions run substantially parallel is to be understood in particular to mean that it is preferable, but not necessary, for the two measurement directions to run parallel in the strict sense. It is thus possible for the two measurement directions to run obliquely relative to one another by a small angle, preferably less than 5°. If the two measurement directions run parallel to one another in the strict sense, the measurement direction plane is the clearly defined plane in which both measurement directions run. The measurement direction plane then runs for example through the split stage rod and the shift gate rod. If the two measurement directions do not run parallel to one another in the strict sense, then the measurement direction plane is selected to be a compensating plane that lies such that the square of the angles which the two measurements form with the compensating plane is at a minimum.

In a preferred embodiment, the third direction encloses an angle of greater than 80° with the measurement direction plane. In this way, interfering influences of the individual sensors on one another are substantially minimized. The greater the angle is, the lesser the interfering influences are. It is therefore particularly preferable for the third measurement direction to stand substantially perpendicular on the measurement direction plane.

The interference of the individual sensors among one another is particularly low if the split sensor measurement direction and the shift gate sensor measurement direction run substantially parallel and the gear sensor measurement direction forms an obtuse angle, which is in particular greater than 90°, with the measurement direction plane.

A particularly robust transmission actuator is obtained if the shift gate sensor comprises a shift gate sensor magnet that extends over less than one third, in particular over less than one fifth, of a shift gate rod circumferential angle of the shift gate rod. The circumferential angle is determined by determining a longitudinal axis of the shift gate rod. If the shift gate rod is substantially cylindrical, the shift gate rod is rotationally symmetrical with respect to the longitudinal axis. Proceeding from the longitudinal axis, the circumferential angle is the angle range in which the shift gate sensor magnet appears as viewed from the longitudinal axis.

To be able to determine the shift gate rod position particularly accurately by means of the shift gate sensor magnet, a shift gate sensor magnet that runs completely around the shift gate rod, such that the circumferential angle is 360°, is advantageous. It has however surprisingly been found to be advantageous for the shift gate sensor magnet to be made smaller. Although this results in a weaker signal being obtained, this disadvantageous effect is outweighed in that the interfering signals on the two other sensors are lower. Therefore, the smaller the circumferential angle over which the gate sensor magnet extends, the more advantageous it is with regard to the interfering influence on the other sensors. The circumferential angle therefore preferably amounts to a fraction of the circumferential angle, in particular less than 70°, or even less than 45°.

Signals that are particularly easy to evaluate are obtained if the gate sensor magnet is fastened in circular segment form and in a rotationally fixed manner to the shift gate rod. In this way, the shift gate rod sensor firstly provides particularly strong position signals that are easy to evaluate, and secondly, the interfering influence on the other sensors is low.

According to one embodiment, the shift gate sensor magnet is fastened to an adapter that is fastened to the shift gate rod so as to be immovable in a shift gate rod longitudinal direction, with the adapter being guided in a guide sleeve so as to be rotationally fixed about the shift gate rod longitudinal direction. Here, the shift gate rod longitudinal direction runs along the shift gate rod longitudinal axis and corresponds to the shift gate sensor measurement direction. The guide sleeve is for example fastened to a housing. The name "guide sleeve" is not to be understood in a restrictive manner to mean that the guide sleeve must completely surround the adapter radially. It is essential merely that the guide sleeve permits rotationally fixed guidance of the adapter. The feature that the adapter is guided in the guide sleeve so as to be rotationally fixed is to be understood in particular to mean that the adapter cannot rotate about the shift gate rod longitudinal direction.

Alternatively, the transmission actuator has a spiral spring that is rotationally fixedly fastened to the housing, with the adapter being rotationally fixedly fastened to the spiral spring such that the adapter is rotationally fixedly fastened to the housing.

The shift gate sensor preferably comprises a shift gate sensor element for detecting the shift gate rod position by measuring a shift gate sensor magnet position of the shift gate sensor magnet. In the same way, the gear sensor preferably comprises a gear sensor element arranged so as to detect the gear rod position by measuring a gear sensor magnet position of a gear sensor magnet. The split sensor preferably comprises a split sensor annular magnet fastened to a split rod, with the split rod being arranged relative to the transmission such that a shift of the split stage of the transmission leads to a longitudinal movement of the split sensor annular magnet, and with the split sensor comprising a split sensor element arranged so as to detect the longitudinal movement. In other words, the sensor elements are preferably magneto-inductive sensor elements, in particular a PLCD sensor element (permanent magnet linear contactless displacement; linear contactless movement sensors with permanent magnets).

The transmission actuator preferably has a sensor element housing that engages around the split sensor element, the shift gate sensor element and the gear sensor element. Where reference is made above to a housing, this means in particular the sensor element housing.

Still other objects and advantages of the present invention will in part be obvious and will in part be apparent from the specification.

The present invention accordingly comprises the features of construction, combination of elements and arrangement of parts, all as exemplified in the constructions herein set forth, and the scope of the invention will be indicated in the claims.

BRIEF DESCRIPTION OF THE DRAWINGS

In the following text, exemplary embodiments of the invention will be explained in more detail on the basis of the appended drawings, in which.

DETAILED DESCRIPTION OF THE PREFERRED EMBODIMENTS

Figure 1:
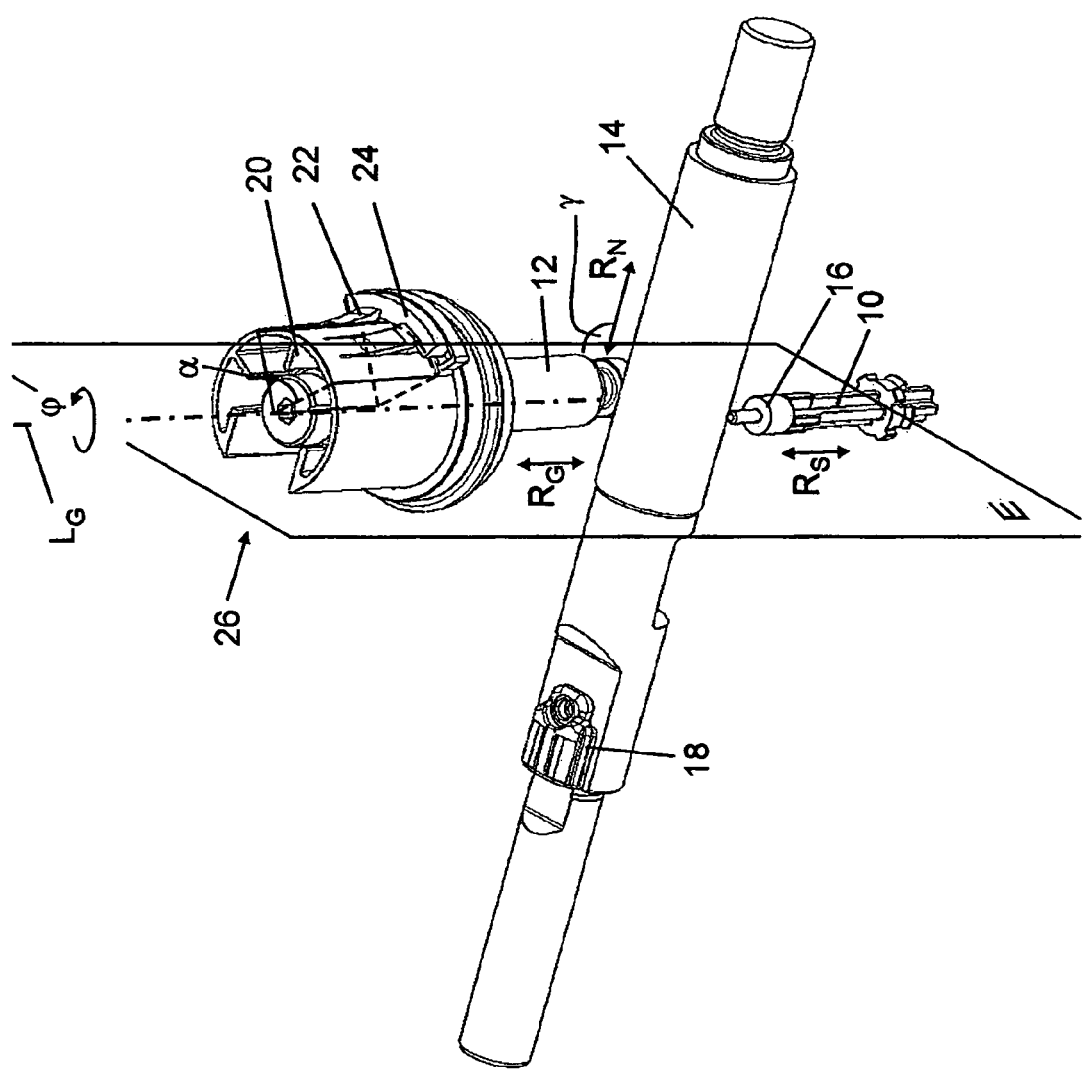
FIG. 1 shows an arrangement of a shift gate sensor and of a split sensor relative to a gear rod of a transmission in accordance with an embodiment of the present invention.

Referring now to the drawing figures, FIG. 1 shows a split stage rod 10 of a transmission (not otherwise shown), which split stage rod 10 is longitudinally movable in a split sensor measurement direction $R_S$. FIG. 1 also shows a shift gate rod 12 mounted so as to be longitudinally movable in a shift gate sensor measurement direction $R_G$. Also shown is a gear rod 14 mounted so as to be movable in a gear sensor measurement direction $R_N$. The split sensor measurement device $R_S$ and the gear sensor measurement direction $R_G$ are parallel to one another and span a measurement direction plane E. The gear sensor measurement direction $R_N$ runs at an angle γ relative to the measurement direction plane E, with the angle γ in the present case being 90°, such that the gear sensor measurement direction $R_N$ runs in the normal direction with respect to the measurement direction plane E.

Arranged on the split stage rod 10 is a split sensor annular magnet 16 through which the split stage rod 10 extends centrally in the longitudinal direction thereof. The split sensor annular magnet 16 is part of a split sensor designed to detect a shift position of the split stage rod 10.

A gear sensor magnet 18 is fastened, for example adhesively bonded or screwed, to the gear rod 14. The gear sensor magnet is part of a gear sensor designed to detect a gear rod position of the gear rod 14. An adapter 20 is fastened to the shift gate rod 12 so as to be immovable in the shift gate sensor measurement direction $R_G$. The adapter 20 has a shift gate sensor magnet holder 22 by means of which a shift gate sensor magnet 24 is fastened, in the present case clipped. The shift gate sensor magnet 24 is in the shape of a circular segment and extends over a shift gate rod circumferential angle α of 90°. In other words, the shift gate sensor magnet 24 appears at an angle of 90° as viewed from a shift gate rod longitudinal axis $L_G$. The determination of the shift gate rod circumferential angle α is indicated in the drawing figure by dashed lines. The abovementioned shift gate rod longitudinal direction corresponds to the shift gate rod longitudinal axis.

In the present case, the adapter 20 is formed as a plastic injection moulded part and has a guide groove 26 into which a guide lug (not shown) of a guide sleeve (likewise not shown) engages. In this way, the adapter 20 is fastened in a rotationally fixed manner, that is, it can rotate about the shift gate rod longitudinal axis $L_G$ only by a rotational angle φ of a few degrees.

Figure 2:
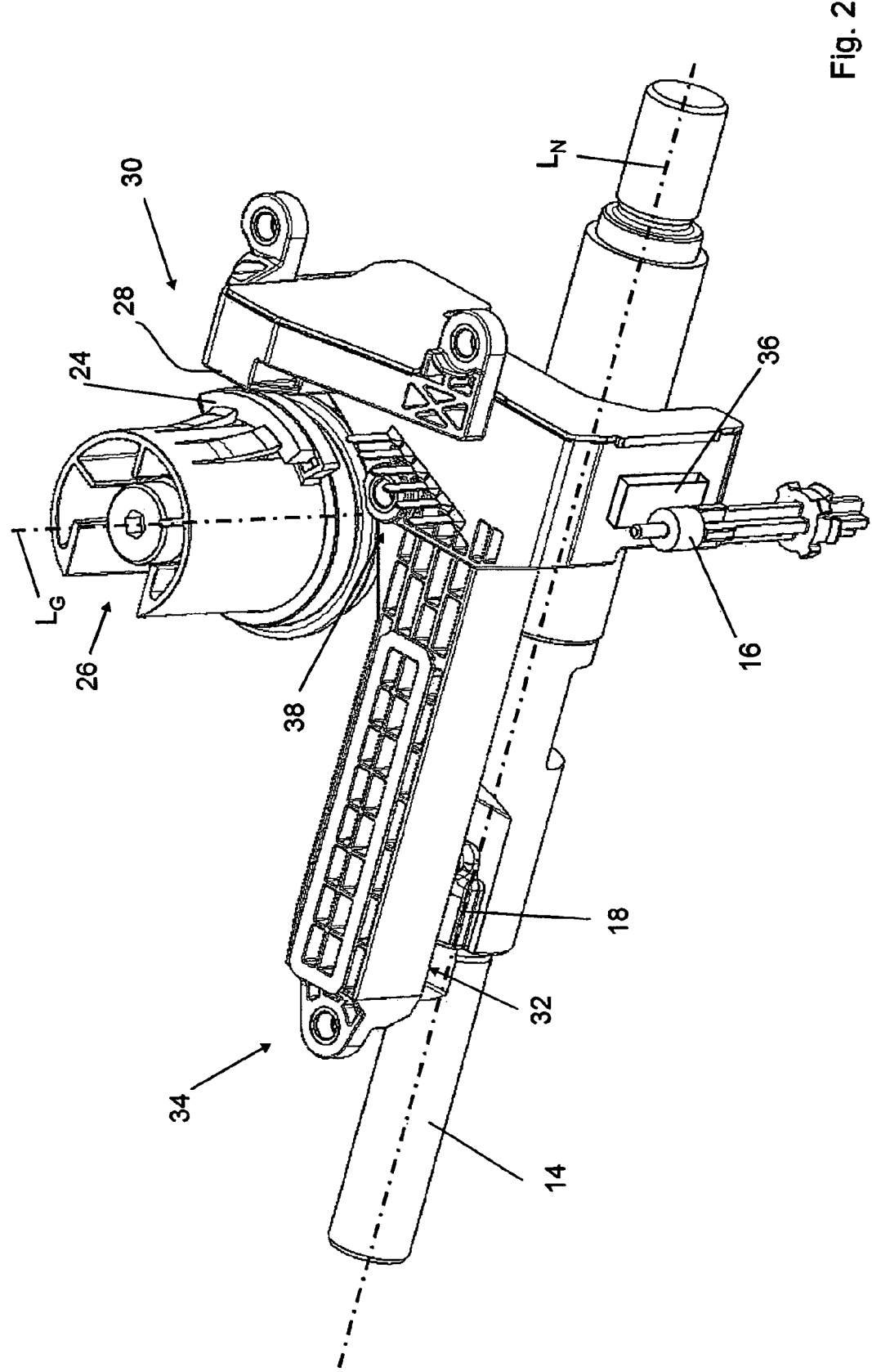
FIG. 2 shows the arrangement according to FIG. 1, additionally with a gear sensor.

FIG. 2 shows the shift gate sensor magnet 24, which is spaced apart from a shift gate sensor element 28 by between 4 mm and 9 mm and which, together with the shift gate sensor element 28, is part of a shift gate sensor 30. The shift gate sensor element is a PLCD sensor element by means of which the position of the shift gate sensor magnet 24 along the shift gate rod longitudinal axis $L_G$ is detected.

FIG. 2 further shows a gear sensor element 32, which, together with the gear sensor magnet 18, is part of a gear sensor 34 that detects a gear rod position of the gear rod 14 along the gear rod longitudinal axis $L_N$ thereof.

The split sensor annular magnet 16 interacts with a schematically shown split sensor element 36, which detects the position of the split sensor annular magnet 16. The shift gate sensor element 28, the gear sensor element 32 and the split sensor element 36 are all connected to a common evaluating chip that calculates the respective positions of the split stage rod 10, of the shift gate rod 12 and of the gear rod 14 and outputs the positions thereby determined via a single interface 38.

Figure 3:
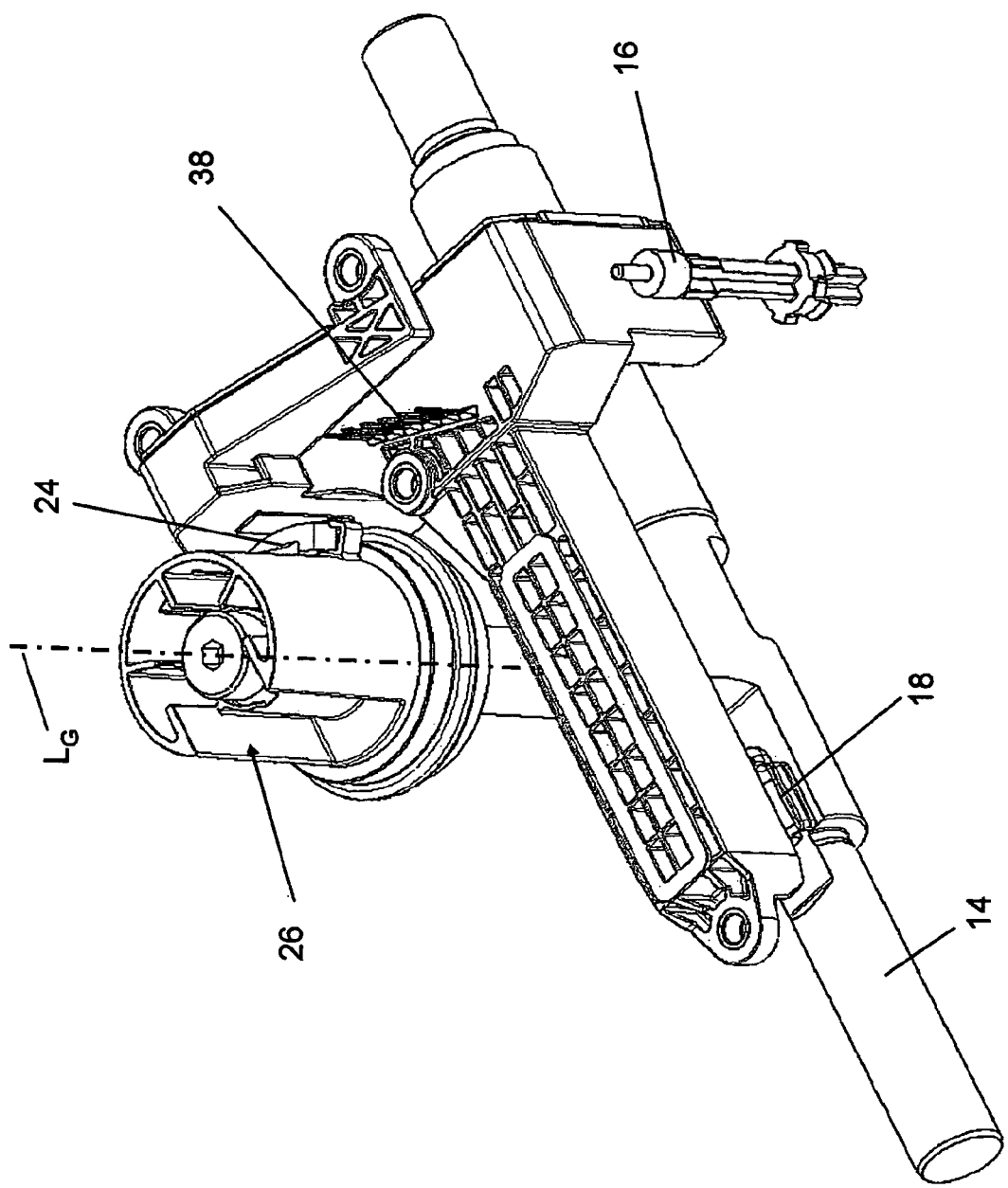
FIG. 3 is a different, perspective view of the arrangement according to FIG. 2.

FIG. 3 shows the components shown in FIG. 2 in a different view, in which it is possible to see into the guide groove 26.

Figure 4:
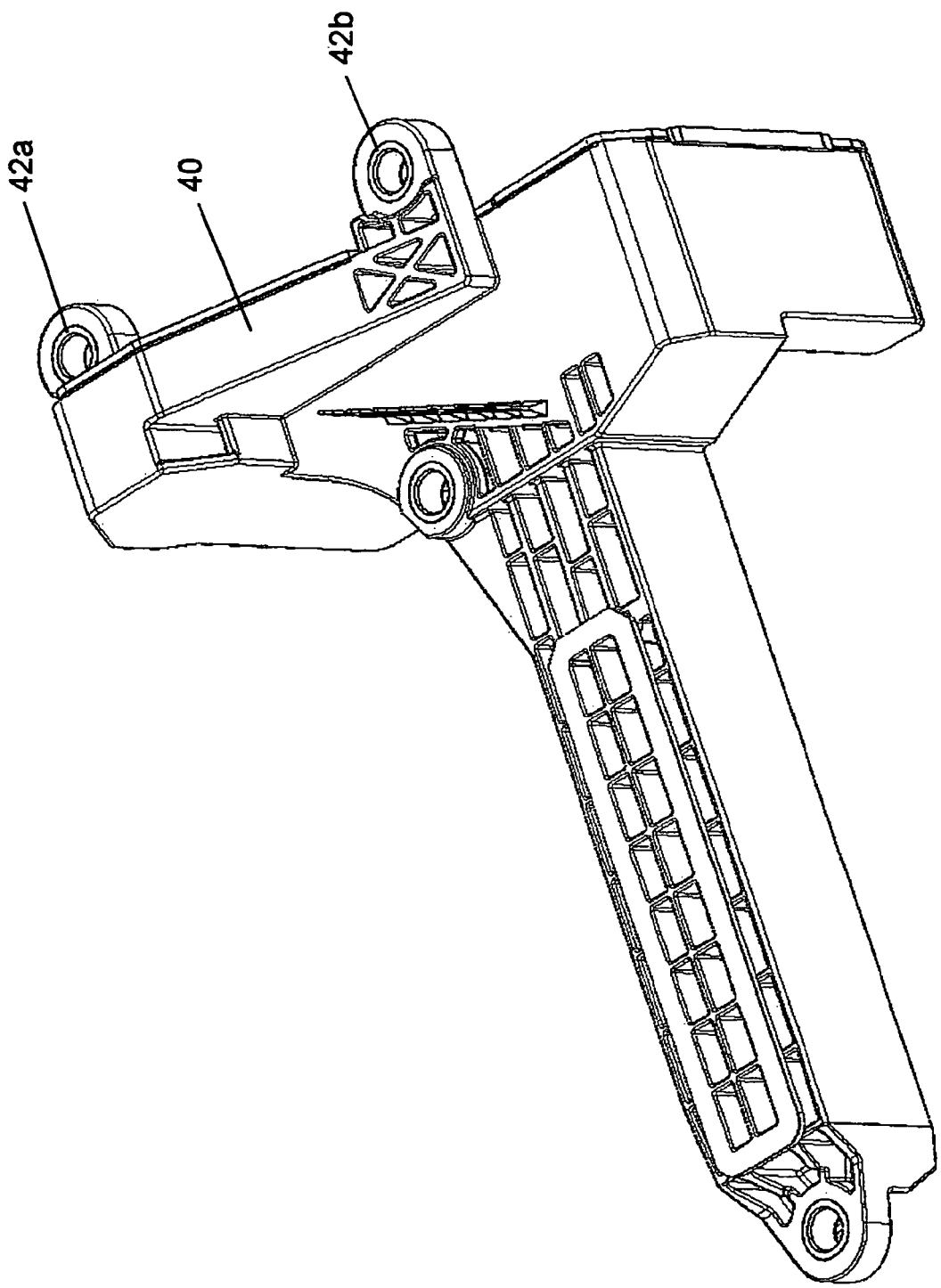
FIG. 4 shows a sensor element housing for a transmission actuator according to an embodiment of the present invention.

FIG. 4 shows a sensor element housing 40 that holds within it the shift gate sensor element 28 (cf. FIG. 2), the gear sensor element 32 and the split sensor element 36. By means of two assembly bores 42a, 42b, the sensor element housing 40 can be fastened to further components of the transmission actuator according to the embodiments of the invention. The components surrounded by and fastened to the sensor element housing 40 form a sensor assembly that constitutes an independent object of invention.

Figure 5:
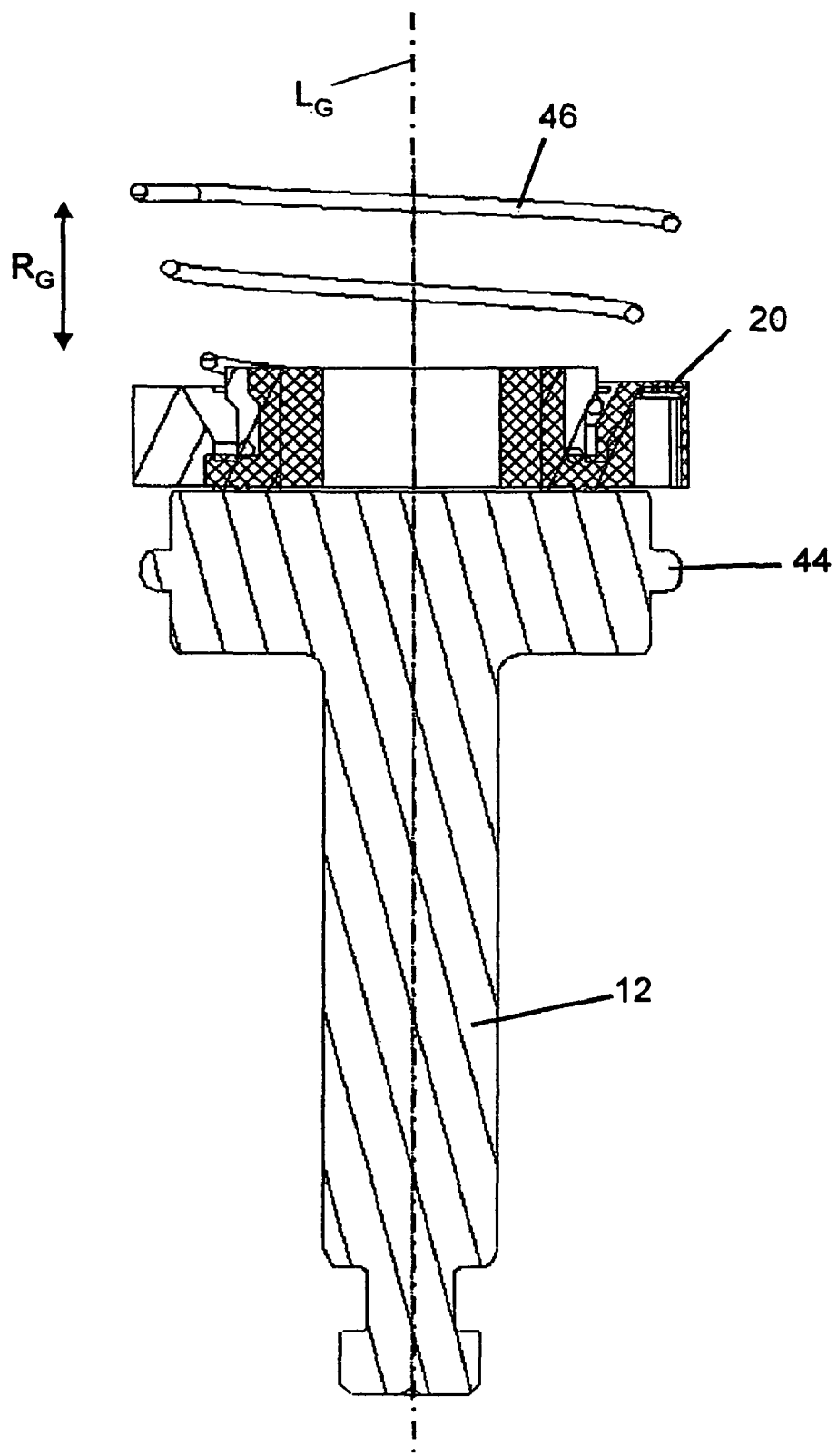
FIG. 5 shows a cross section through an adapter of a transmission actuator according to an embodiment of the present invention.

FIG. 5 shows a shift gate rod 12 which has a head part 44 to which the adapter 20 is fastened. Rotationally fixedly fastened to the adapter 20 is a spiral spring 46 which in turn is rotationally fixedly fastened to the sensor element housing 40 (cf. FIG. 4). Since the spiral spring 46 therefore cannot rotate about the shift gate rod longitudinal axis $L_G$, the adapter 20 is also mounted so as to be rotationally fixed relative to the sensor element housing 40. The adapter 20 is nevertheless movable in the shift gate sensor measurement direction $R_G$.

Figure 6:
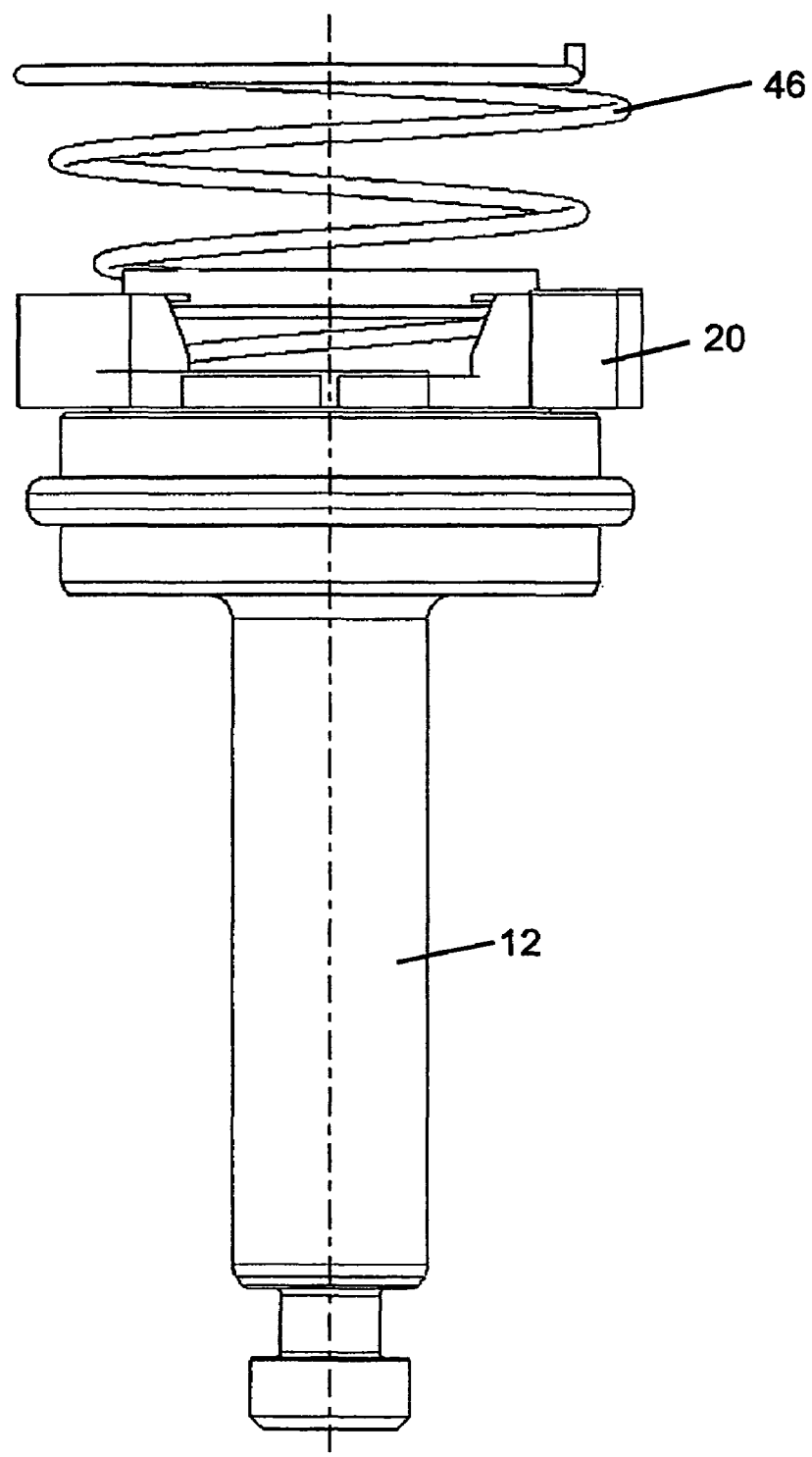
FIG. 6 is a side view of the adapter according to FIG. 5.

FIG. 6 shows a side view of the adapter 20. It can be seen that the spiral spring 46 has a locking section 48, by means of which said spiral spring 46 is fastened to the sensor element housing 40.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. An actuator for a transmission, comprising
a split sensor configured to detect a shift position of a split stage rod of the transmission, the split stage rod being longitudinally movable in a split sensor measurement direction;
a shift gate sensor configured to detect a shift gate rod position of a shift gate rod of the transmission, the shift gate rod being longitudinally movable in a shift gate sensor measurement direction; and
a gear sensor configured to detect a gear rod position of a gear rod of the transmission, the gear rod being longitudinally movable in a gear sensor measurement direction;
the split sensor measurement direction and the shift gate sensor measurement direction being substantially parallel and spanning a measurement direction plane, and
the gear sensor measurement direction forming an angle one of greater than and equal to about 90° with the measurement direction plane.

2. The actuator according to claim 1, wherein the angle is between about 90° and 100°.

3. The actuator according to claim 1, wherein the angle is an obtuse angle.

4. The actuator according to claim 1, wherein the shift gate sensor comprises a shift gate sensor magnet that extends over less than one third of a shift gate rod circumferential angle of the shift gate rod.

5. The actuator according to claim 4, wherein the shift gate sensor magnet is fastened to the shift gate rod in circular segment form.

6. The actuator according to claim 4, wherein
the shift gate sensor magnet is fastened to an adapter, the adapter being fastened to the shift gate rod so as to be immovable in a shift gate rod longitudinal direction, and
the adapter being guided in a guide sleeve so as to be rotationally fixed about the shift gate rod longitudinal direction.

7. The actuator according to claim 1, further comprising
a housing;
a spiral spring rotationally fixedly fastened to the housing; and
an adapter rotationally fixedly fastened to the spiral spring.

8. The actuator according to claim 4, wherein the shift gate sensor comprises a shift gate sensor element configured to detect the shift gate rod position by measuring a shift gate sensor magnet position of the shift gate sensor magnet.

9. The actuator according to claim 1, wherein the gear sensor comprises a gear sensor element configured to detect the gear rod position by measuring a gear sensor magnet position of a gear sensor magnet.

10. The actuator according to claim 1, wherein
the split sensor comprises a split sensor annular magnet fastened to the split stage rod,
the split stage rod being arranged relative to the transmission such that a shift of the split stage of the transmission effects a longitudinal movement of the split sensor annular magnet; and wherein
the split sensor comprises a split sensor element configured to detect the longitudinal movement.

11. The actuator according to claim 1, wherein the shift gate sensor includes a shift gate sensor element, wherein the gear sensor includes a gear sensor element, and wherein the split sensor includes a split sensor element, at least one of the split sensor element, the shift gate sensor element and the gear sensor element being a PLCD sensor element.

12. The actuator according to claim 11, further comprising a sensor element housing accommodating the split sensor element, the shift gate sensor element and the gear sensor element.

13. A transmission, comprising an actuator according to claim 1.

14. The actuator according to claim 4, wherein the shift gate sensor magnet extends over less than one fifth of the shift gate rod circumferential angle.

* * * * *

UNITED STATES PATENT AND TRADEMARK OFFICE
CERTIFICATE OF CORRECTION

PATENT NO. : 8,359,942 B2  Page 1 of 1
APPLICATION NO. : 12/736093
DATED : January 29, 2013
INVENTOR(S) : Brammer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this
First Day of September, 2015

Michelle K. Lee
*Director of the United States Patent and Trademark Office*